United States Patent [19]
Fazekas

[11] Patent Number: 4,576,455
[45] Date of Patent: Mar. 18, 1986

[54] DUAL MOTOR REVERSIBLE DRIVE FILM MAGAZINE

[75] Inventor: Carl F. Fazekas, Tarzana, Calif.

[73] Assignee: Panavision, Inc., Tarzana, Calif.

[21] Appl. No.: 578,890

[22] Filed: Feb. 10, 1984

[51] Int. Cl.$^4$ .................................... G03B 23/02
[52] U.S. Cl. ........................... 352/78 R; 352/124; 352/171; 352/173; 352/172
[58] Field of Search .............. 352/78 R, 124, 171, 352/173, 172

[56] References Cited

U.S. PATENT DOCUMENTS

| | | | |
|---|---|---|---|
| 3,410,498 | 11/1968 | Winkler et al. | 352/78 R |
| 3,734,602 | 5/1973 | Deck | 352/124 |
| 3,771,862 | 11/1973 | Land et al. | 352/130 |
| 3,883,090 | 5/1975 | Hall, Sr. | 242/199 |
| 3,977,776 | 8/1976 | Wagensonner et al. | 352/172 |
| 4,174,888 | 11/1979 | Hunn et al. | 352/172 |
| 4,316,656 | 2/1982 | Ishibashi et al. | 352/172 |
| 4,368,961 | 1/1983 | Mattes | 352/5 |
| 4,418,994 | 12/1983 | Gottschalk et al. | 352/78 R |
| 4,466,714 | 8/1984 | Dyfverman | 352/5 |
| 4,483,599 | 11/1984 | Macrae et al. | 352/5 |

Primary Examiner—Monroe H. Hayes
Attorney, Agent, or Firm—Lyon & Lyon

[57] ABSTRACT

A film magazine is provided adapted for running the film stored therein either forward or backward. A first brake within the film magazine provides a drag torque on the supply hub when the supply hub rotates in the forward direction but not when it is rotating in a backward direction. In addition, a second brake is provided for exerting a drag torque on the take-up reel when the take-up reel is rotating in a backward direction, but not when it is running forward.

The brakes and motors within the film magazine are adapted so as to keep tension on the film at all time.

21 Claims, 8 Drawing Figures

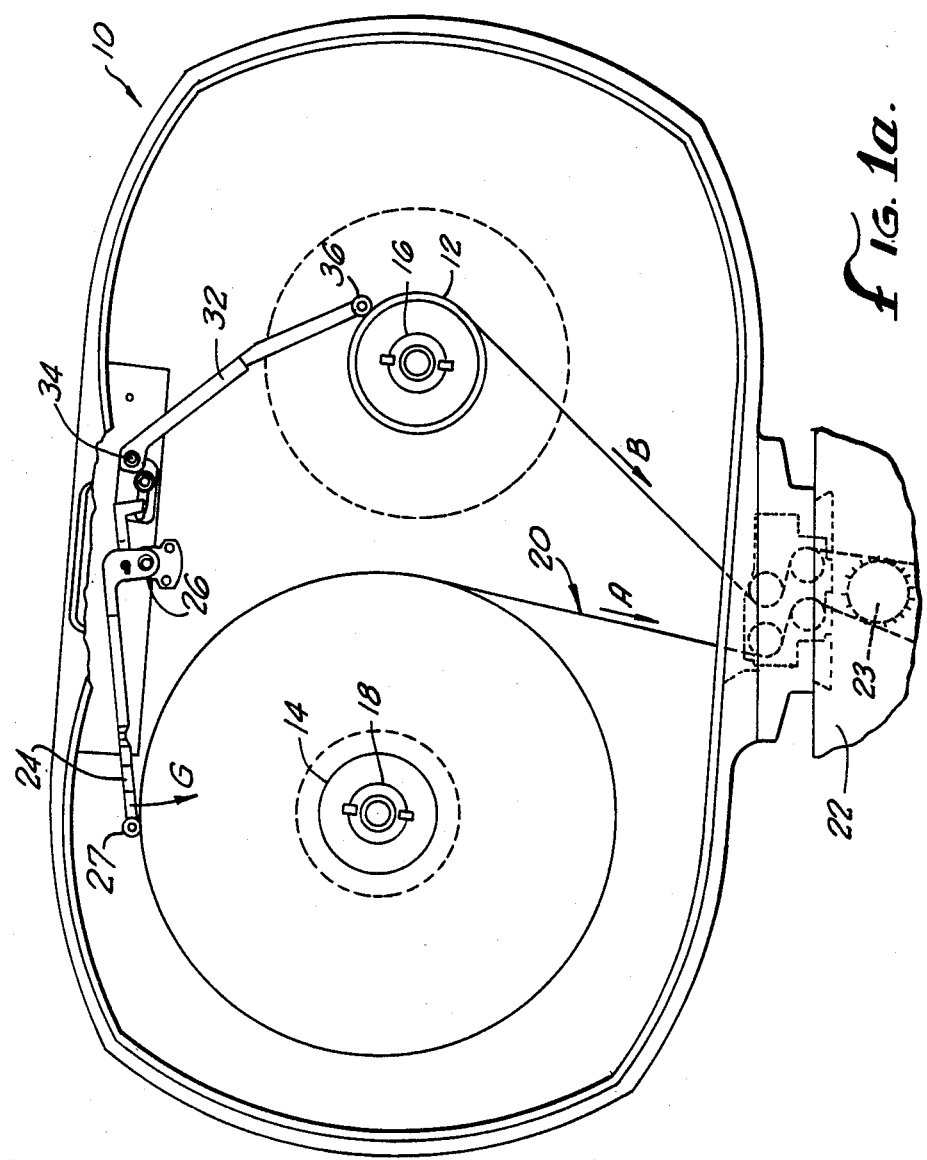

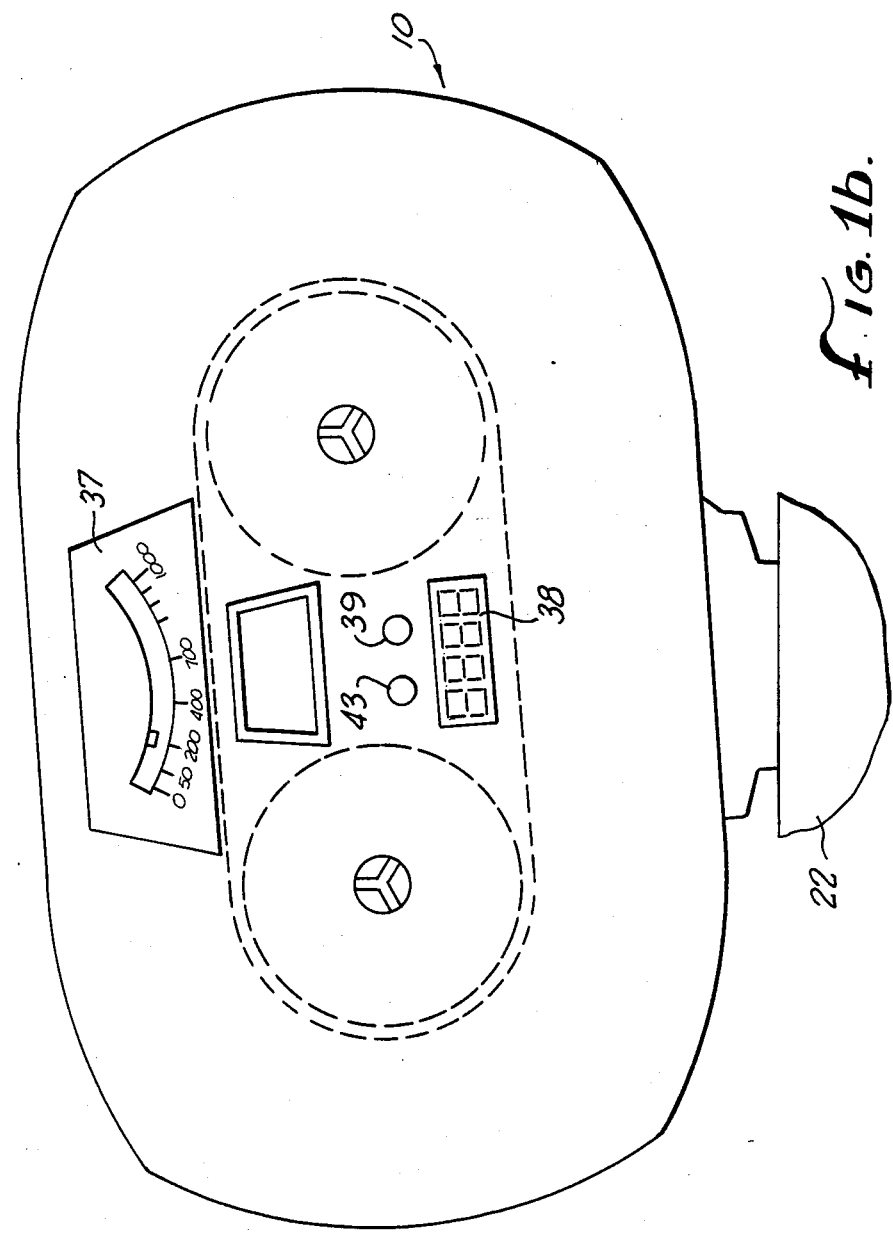

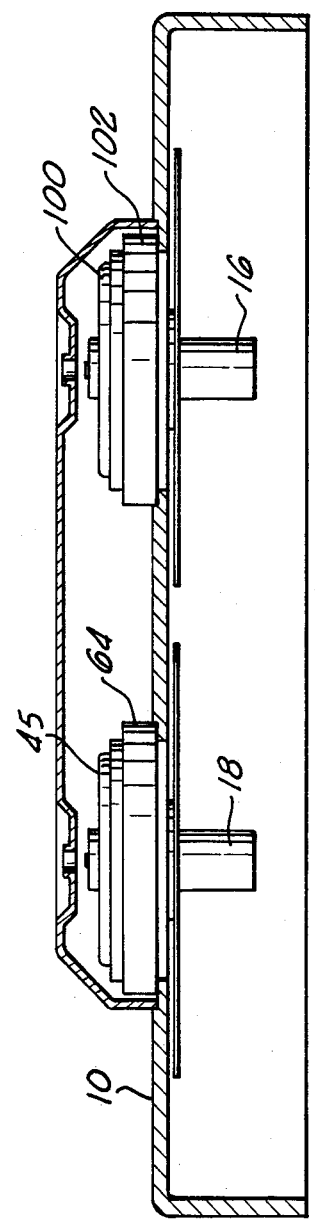

DUAL MOTOR REVERSIBLE DRIVE FILM MAGAZINE

BACKGROUND OF THE INVENTION

This application relates to film magazines for motion picture cameras and more specifically, to motor-driven film magazines. It is well known in the camera art to have a film magazine that contains a supply hub for supporting a supply reel and a take-up hub for supporting a take-up reel. Film from the supply reel is typically pulled out of the magazine and into a camera by a sprocket wheel, where it is exposed. The film is then pulled out of the camera by the take-up reel as it is wound onto the take-up reel.

It is known in the art to have a reversible film magazine which can run either forward or backward. When a reversible film magazine runs forward, film is pulled off of a supply reel and into a camera by a sprocket wheel, where it is exposed. The film is then pulled out of the camera by the take-up reel, which is driven by a take-up motor. Thus, when running forward, film is pulled off of the supply reel and wound onto the take-up reel.

When the reversible film magazine is running backward, film is pulled off of the take-up reel and into the camera by the sprocket wheel, and film is pulled out of the camera and wound onto the supply reel, which is driven by a supply motor. Thus, when running backward, film is pulled off of the take-up reel and wound onto the supply reel.

When running backward, the take-up motor is deactivated and the supply motor is activated. When running forward, the supply motor is deactivated and the take-up motor is activated. The ability to run the camera with the film running in either direction enables a cameraman to create a variety of special effects.

It is also known in the art to provide a sensing device for measuring the quantity of film stored on the supply reel. An example of such a device is disclosed in U.S. Pat. No. 4,418,994, entitled "Film Magazine for Motion Picture Camera," issued to Robert E. Gottschalk and Carl F. Fazekas on Dec. 6, 1983. The film magazine disclosed therein includes an arm pivotally coupled to a shaft on one end, and a roller coupled to the other end. The arm is biased so that during operation, the roller rides along the surface of the film stored on the supply reel. The quantity of the film on the supply reel therefore determines the angle that the arm is resting at. The angle of the arm can be sensed through a suitable electromechanical transducer.

In reversible film magazines, it is known to provide two such sensing mechanisms. A first arm has a roller that rides along the surface of the film stored on the supply reel, while a second arm has a roller that rides along the surface of the film stored on the take-up reel. Suitable transducers can be used to provide the cameraman with an indication of how much film is stored on both reels.

SUMMARY OF THE INVENTION

A reversible film magazine is provided for use with a motion picture camera. The reversible film magazine includes a supply hub for supporting a supply reel of film, a supply motor for driving the supply hub, a take-up reel for supporting a take-up reel of film, a take-up motor for driving the take-up reel, a sensing mechanism for measuring the quantity of film stored on the supply reel, and another sensing mechanism for measuring the quantity of film stored on the take-up reel.

It is desirable to provide a certain amount of drag to the supply reel when the magazine is running forward. This is done to avoid spillage. (Spillage occurs when the sprocket wheel within the camera stops pulling film off of the supply reel, but the supply reel keeps spinning because of its inertia.) Accordingly, a supply brake is provided for applying a dragging torque to the supply reel when the magazine is running forward, but not when the magazine is running backward.

This is accomplished by coupling the supply hub to a supply shaft. The supply shaft is driven by the supply motor when the magazine is running backward. The supply shaft also runs through a one-way clutch. The one way clutch is rigidly coupled to a disk brake, so that when the magazine is running backward, the shaft rotates in a first direction, the shaft is permitted to freely spin within the one way clutch, and the disk brake causes no torque to be applied to the supply shaft. However, when the magazine is running forward, the shaft rotates in the opposite direction, and the one-way clutch engages with the shaft, with the result that the disk brake applies a torque to the shaft when it rotates.

It is also desirable to apply a dragging torque to the take-up reel when the magazine is running backward. This is done to avoid spillage when the magazine is running backward. Accordingly, a take-up brake is provided for applying a dragging torque to the take-up hub when the magazine is running backward but not when it is running forward.

This is accomplished by coupling the take-up hub to a take-up shaft which is driven by the take-up motor when the magazine is running forward. The take-up shaft also runs through a one-way clutch which is rigidly coupled to a disk brake. When the magazine is running forward, the take-up shaft rotates in a first direction, and the take-up shaft is permitted to rotate freely within the take-up clutch. However, when the magazine is running backward, the take-up shaft rotates in the opposite direction, and the take-up shaft engages with the one-way clutch, with the result that the disk brake applies a drag torque to the take-up shaft.

In this arrangement, the film in the camera is under tension because each reel is pulling on the film. When the magazine is running forward, the take-up motor is pulling the film onto the take-up reel and the supply brake is applying a dragging force to supply reel, which creates a tension in the film. When the magazine is running backward, the supply motor is pulling the film onto the supply reel and the take-up brake is applying a dragging force to the take-up reel which in turn creates a tension in the film. Therefore, each reel pulls on the film to tighten the film pack.

BRIEF DESCRIPTION OF THE DRAWINGS

FIG. 1a is an illustration of the interior of a film magazine in accordance with a preferred embodiment of the invention.

FIG. 1b is an illustration of the exterior of the left side of film magazine illustrated in FIG. 1a.

FIG. 3 is a cross sectional illustration of the motor and brake mechanism coupled to the supply hub of the film magazine of FIG. 1a.

FIG. 5b is an illustration of the exterior of the brake housing of FIG. 5a.

FIG. 6 is a cross sectional view of the film magazine illustrating the take-up hub, the housing for the take-up motor and brake, the supply hub, and the housing for the supply motor and brake.

DETAILED DESCRIPTION OF THE PREFERRED EMBODIMENTS

Figure 2:
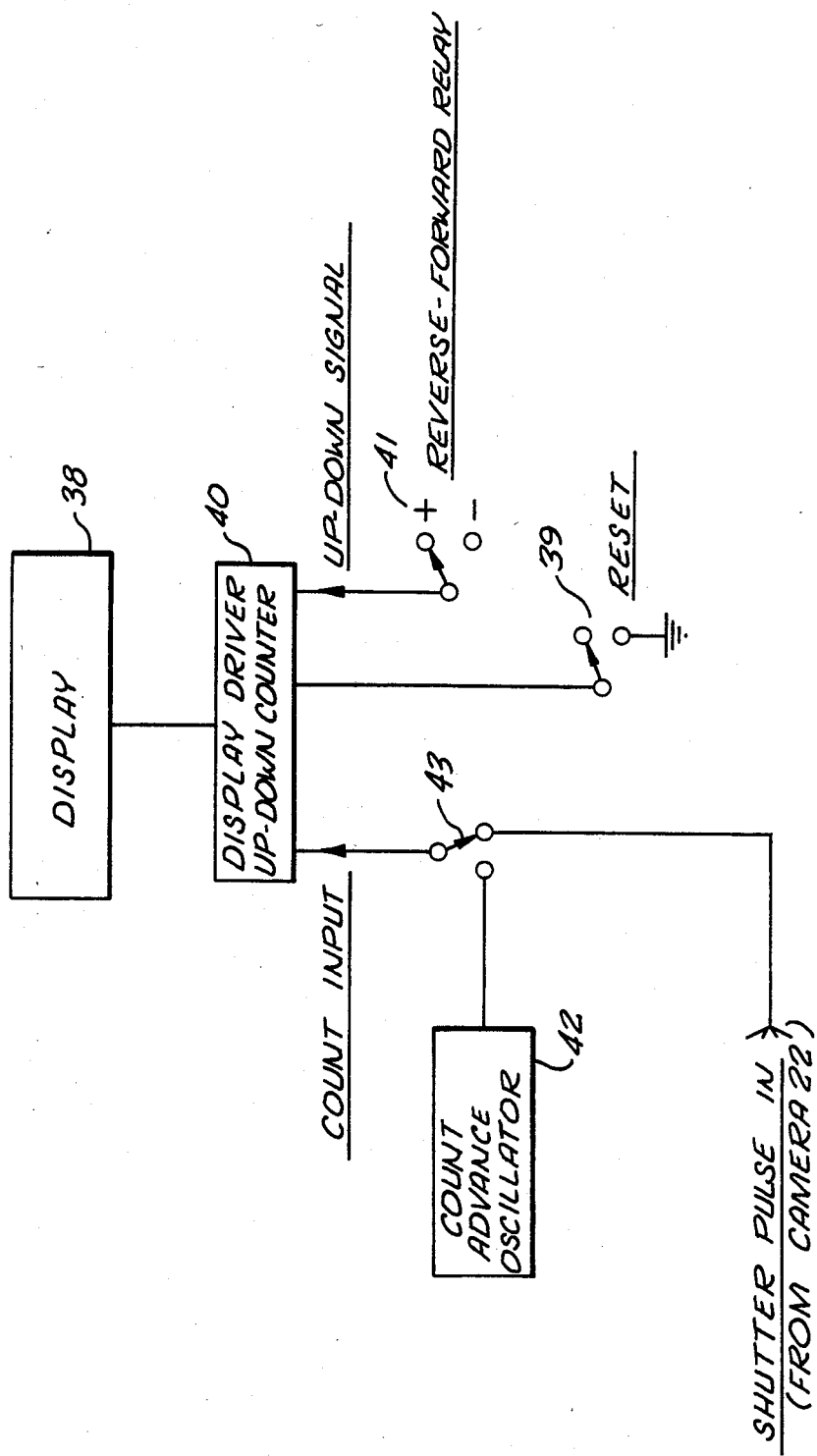
FIG. 2 is a block diagram of a circuit for driving a frame count display on the magazine illustrated in FIGS. 1a and 1b.

Referring to FIG. 1a, a film magazine 10 includes a take-up reel 12 and a supply reel 14 mounted on a take-up hub 16 and a supply hub 18 respectively. When the magazine is running forward, film 20 stored on supply reel 14 is pulled off of supply reel 14, out of magazine 10, and into a camera 22 by a sprocket wheel 23, which is part of camera 22. Inside camera 22, film 20 is exposed to light. Film 20 is then pulled out of camera 22, and pulled back into magazine 10, where it is wound onto take-up reel 12. Therefore, when the magazine is running forward, the film runs in the direction of arrow A.

When the magazine is running backward, film 20 is pulled off of take-up reel 12, out of magazine 10, and into camera 22 by sprocket wheel 23. Sprocket wheel 23 also pulls film 20 out of camera 22, and supply reel 14 pulls film 20 into magazine 10. Therefore, when running backward, film 20 runs in the direction indicated by arrow B.

Within magazine 10 is an arm 24 which is pivotally coupled to a pin 26. On the end of arm 24 is a roller 27. Arm 24 is biased so that roller 27 rides along the film stored on supply reel 14. As the quantity of film on supply reel 14 diminishes, arm 24 rotates in the direction of arrow G. When the supply of film on supply reel 14 reaches a predetermined quantity, a shoulder (not shown) affixed to arm 24 actuates a microswitch, which turns off the camera and the magazine. The shoulder and microswitch are coupled to arm 24 in the manner illustrated in U.S. Pat. No. 4,418,994, which is incorporated by reference.

Similarly, an arm 32 is provided which is pivotally coupled to a shaft 34. On the end of arm 32 is a roller 36. Arm 32 is biased so that roller 36 rides along the film stored on take-up reel 12. As the quantity of film on take-up reel 12 changes, arm 32 rotates about shaft 34. When the supply of film on take-up reel 12 reaches a predetermined amount of film, a shoulder (not shown) affixed to arm 32 actuates a microswitch, which turns off the camera and the magazine.

FIG. 1b is an illustration of the exterior of film magazine 10. Provided on the exterior of film magazine 10 is a display 37 for indicating the number of feet of film on supply reel 14. This indicator presents information in response to the position of arm 24 (shown in FIG. 1a).

Also illustrated in FIG. 1b is a frame counter display 38, which is typically an LCD display. Frame counter display 38 provides a count of the number of frames that pass through camera 22. This displayed quantity can be reset by a reset button 39 also present on the exterior of film magazine 10. By resetting the frame count to zero, any frame on film 20 can be used as a reference point, i.e. as frame zero. Frame counter display 38 counts up when the film is running forward, and counts down when the film is running backward. As illustrated in FIG. 2, frame counter display 38 is driven by a display driver 40 which is electronically coupled to the shutter mechanism within camera 22. Pulses from the shutter mechanism indicate to a display driver 40 the passage of each frame as it passes the shutter. Display driver 40 will count up when a relay 41 is in a state indicative of forward operation of the film magazine, and count down when relay 41 is in a state indicative of reverse operation of the film magazine.

Also provided in the frame count mechanism is a count advance oscillator 42 which can be coupled to display driver 40 via a switch 43 when the cameraman wants to advance the frame count displayed by frame counter display 38.

Figure 3:
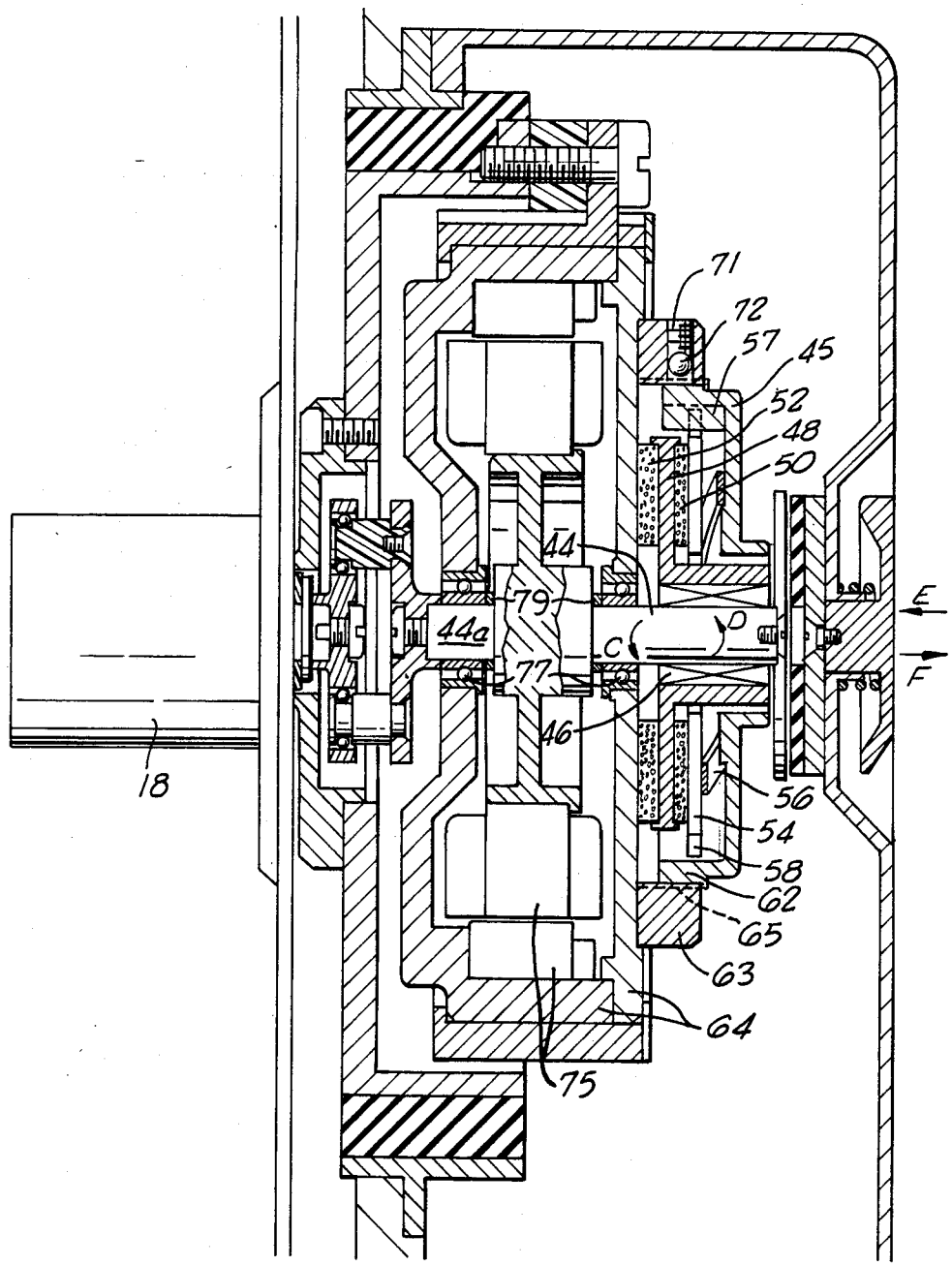

Supply hub 18 (shown in FIG. 1a) is coupled to an end 44a of a shaft 44 (shown in FIG. 3). Shaft 44 is driven by a DC electric motor 75 (shown in cross section in FIG. 3) in a direction indicated by arrow D when the magazine is running backward, and applies a braking force when rotated in a direction indicated by arrow C, i.e. when the magazine is running forward. Referring to FIG. 3, shaft 44 extends past a brake housing wall 45 and through a one-way clutch 46. One-way clutch 46 is of a variety such as model number RC-040708 available from Torrington, Inc. Rigidly coupled to the outer race of one-way clutch 46 is a disk 48 which rides between a pad 50 and a pad 52. Adjacent to pad 50 is a pressure disk 54 which is urged toward disk 48 by a wave washer 56. Wave washer 56 is placed between brake housing wall 45 and pressure disk 54 to exert a spring-like force.

Figure 4:
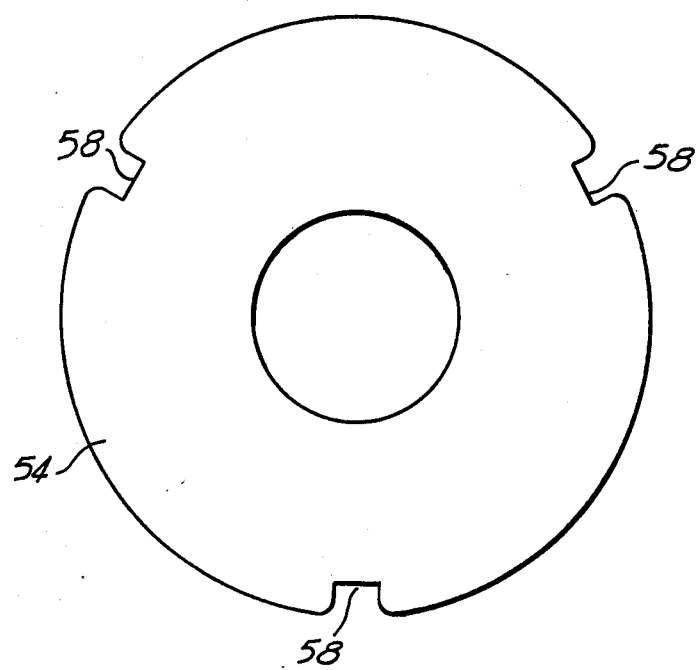
FIG. 4 is an illustration of a disk used in the brake mechanism of FIG. 3.
Figure 5A:
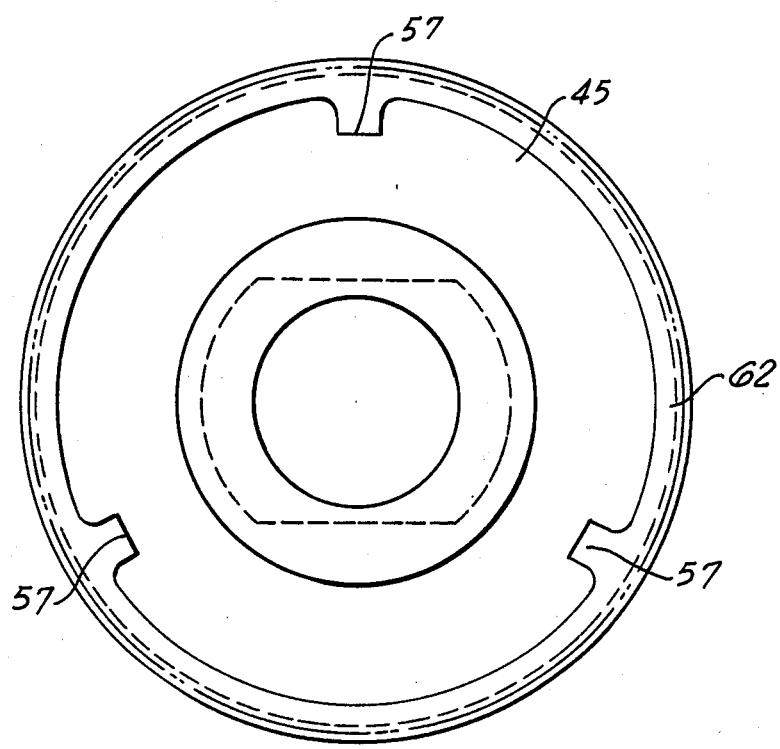
FIG. 5a is an illustration of the interior of a brake housing used in the brake mechanism of FIG. 3.
Figure 5B:
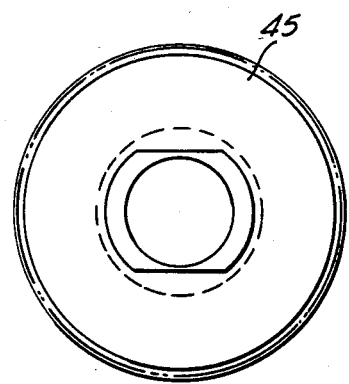

As best illustrated in FIGS. 4 and 5a, pressure disk 54 is kept from rotating by a set of extension members 57 which extend into notches 58 in pressure disk 54. Extension members 57 extend from a portion 62 (FIG. 3) of brake housing wall 45. Pressure disk 54, brake disk 48, and one-way clutch 46 are mounted for movement in directions indicated by arrows E and F.

In operation, when shaft 44 rotates in the direction of arrow C, one way clutch 46 engages, and disk 48 rotates along with shaft 44. Pads 50 and 52 exert a drag on disk 48, and thus exert a braking torque on shaft 44. When shaft 44 rotates in a direction opposite the direction indicated by arrow C (the direction indicated by arrow D), one way clutch 46 does not engage, shaft 44 rotates freely in one-way clutch 46, and disk 48 does not exert a torque on shaft 44.

It is desirable to be able to adjust the drag exerted on disk 48. This is accomplished by moving brake housing wall 45 in a direction indicated by arrow E when one wishes to increase the drag, and moving brake housing wall 45 in a direction indicated by arrow F when one wishes to decrease the drag. To permit this, a motor mounting ring 63 is rigidly affixed to a motor housing 64. The interior of motor mounting ring 63 includes a threaded portion 65. Similarly, portion 62 of brake housing 45 is threaded, and is received into motor mounting ring 63. By rotating brake housing 45, it is possible to move it either in direction E or direction F. When the brake housing is advanced toward motor housing 64, wave washer 56 is further compressed, and exerts increased pressure on pressure disk 54 which in turn exerts pressure on pad 50 which in turn exerts pressure on brake disk 48, which in turn exerts pressure on pad 52, which in turn pushes back on brake disk 48.

By adjusting the position of brake housing wall 45, one can adjust the braking torque within a range of 10 inch-ounces to 40 inch-ounces. The torque is typically adjusted to a value depending upon the number of feet and width of the film to be used in the magazine. For example, when using 1000 feet of 35 mm film, approximately, 25 inch-ounces would be the appropriate torque to provide.

A set screw 71 is provided to secure brake housing wall 45 from moving once it is set to apply a desired torque. By advancing screw 71 in a downward direction, screw 71 compresses a nylon ball 72, which in turn exerts a force on housing 45, preventing it from rotating.

As described above, affixed to brake housing wall 45 is a motor housing 64. Within motor housing 64 is DC electric torque motor 75, which is of a variety such as model number 3000C-065-035, available from Magnetic Technology, Inc. The armature of motor 75 is rigidly coupled to shaft 44, thus rotating shaft 44 when the motor is energized. In this way, motor 75 turns the supply reel 14 in direction D.

When the camera runs backward, motor 75 which drives supply reel 14 is energized and the film runs in direction B. When the camera runs forward, motor 75 is not energized, and the take-up motor driving take-up reel 12 is energized, thus causing the film to run in direction A, and causing shaft 44 to rotate in direction C.

Also illustrated in FIG. 3 are a set of ball bearings 77, an inner portion of which is coupled to shaft 44, and an outer portion of which is rigidly coupled to motor housing 64. A pair of shims 79 are placed between shaft 44 and the rotating portion of ball bearings 77 to limit any axial movement of shaft 44.

Referring to FIG. 6, a cross sectional view of part of film magazine 10 illustrates brake housing wall 45 which holds the brake for supply reel 14, motor housing 64 which holds motor 75 which drives the supply reel 14, a brake housing 100 which holds the brake mechanism for the take-up reel 12, and a motor housing 102 which holds the motor for the take-up reel 12.

The mechanism illustrated in FIG. 3, which drives or drags supply reel 14 is identical to the mechanism which drives or drags take-up reel 12. Therefore, a separate detailed illustration of the take-up motor and brake is not provided. Motor 75 and the motor for driving take-up reel 12 are driven by conventional means. As mentioned above, when the position of arm 24 indicates that supply reel 14 reaches a predetermined minimum, camera 22 stops, causing power to the take-up motor to be cut off. Similarly, when the position of arm 32 indicates that take-up reel 12 reaches a predetermined minimum, camera 22 stops, causing power to motor 75 to be cut off.

While the invention has been particularly taught and described with reference to the preferred embodiments, those versed in the art will appreciate that minor modifications in form and detail may be made without departing from the spirit and scope of the invention. For instance, a different type of one-way clutch could be used. In addition, more than one brake disk could be used in conjunction with each reel in the film magazine. Accordingly, all such modifications are embodied within the scope of this patent as properly come within my contribution to the art and are particularly pointed out by the following claims.

I claim:

1. A film magazine comprising:
   a supply hub adapted to support a supply reel of film;
   a shaft adapted to couple with the supply hub;
   a one way clutch adapted to couple with the shaft, the one way clutch adapted to permit free and independent rotation of the shaft relative to the one way clutch when the shaft is rotating in a first direction, the one way clutch adapted to rotate in response to shaft rotation when the shaft is rotating in a second direction opposite the first direction;
   drag means for applying a torque to the one way clutch for causing resistance to the rotation of said shaft only in the second direction; and
   motor means for driving the shaft in the first direction.

2. The film magazine of claim 1 wherein the drag means comprises:
   a disk having a first side and a second side, the disk being rigidly coupled to the one way clutch; and
   a first pad adapted to push against the first side of the disk.

3. The film magazine of claim 2 further comprising a second pad adapted to push against the second side of the disk.

4. The film magazine of claim 1 further comprising:
   sensing means for sensing the quantity of film stored on a supply reel; and
   power means for supplying power to the first motor means, the power means denying power to the first motor means in response to a signal provided by the sensing means indicative of the presence of an amount of film on the supply reel less than a predetermined minimum.

5. A film magazine comprising:
   a supply hub adapted to support a supply reel of film;
   a shaft adapted to couple with the supply hub;
   a one way clutch having a disk, the one way clutch being adapted to couple with the shaft, the one way clutch being adapted to permit free and independent rotation of the shaft relative to the disk when the shaft is rotating in a first direction, the disk being adapted to rotate in response to shaft rotation when the shaft is rotating in a second direction opposite the first direction;
   drag means for applying a torque to the disk for causing resistance to the rotation of said shaft only in the second direction; and
   motor means for driving the shaft in the first direction.

6. The film magazine of claim 5 wherein the drag means includes friction means engaging said disk.

7. The film magazine of claim 5 wherein said drag means includes a first friction pad and a second friction pad, the said disk positioned between and rotating relative to the first and second friction pads, and means for applying force to the said first and second friction pads toward the disk for developing the said torque and resistance to rotation.

8. The film magazine of claim 5 wherein said drag means includes a first friction pad and a second friction pad positioned on opposite sides of said disk for engaging and frictionally resisting rotation of the disk for applying said torque, a pressure disk for engaging one of said friction pads, spring means for urging said pressure disk toward said engagement with the one said friction pad, a housing for supporting said spring means, and said housing being selectively adjustable toward and away from said pressure disk for varying the spring pressure applied on said pressure disk by said spring means to in turn vary the said torque and resistance to said shaft rotation in the second direction.

9. The film magazine of claim 8 wherein said pressure disk is connected to said housing for relative axial movement therebetween and preventing relative rotation therebetween.

10. A film magazine for storing film for use with a film camera comprising:
   a first shaft adapted to couple with a supply reel;
   a first one way clutch having a first disk, the first one way clutch being adapted to couple with the first shaft, the first one way clutch adapted to permit free and independent rotation of the first shaft relative to the first disk when the first shaft is rotating in a first direction, the first housing being adapted to rotate in response to shaft rotation when the first shaft is rotating in a second direction opposite the first direction;
   first drag means for applying a torque to the first disk for causing resistance to the rotation of said shaft only in the second direction;
   first motor means for driving the first shaft in the first direction;
   a second shaft adapted to couple with a take-up reel;
   a second one way clutch having a second disk, the second one way clutch being adapted to couple with the second shaft, the second one way clutch adapted to permit free and independent rotation of the second shaft relative to the second disk when the second shaft is rotating in a first direction, the second housing being adapted to rotate in response to second shaft rotation when the second shaft is rotating in a second direction opposite the first direction;
   second drag means for applying a torque to the second disk for causing resistance to the rotation of said second shaft only in the second direction; and
   second motor means for driving the second shaft in the first direction.

11. The film magazine of claim 10 further comprising:
   first sensing means for sensing the quantity of film stored on a supply reel;
   first power means for supplying power to the first motor means, the power means denying power to the first motor means in response to a signal provided by the sensing means indicative the the presence of an amount of film on the supply reel less than a first predetermined minimum;
   second sensing means for sensing the quantity of film stored on a take-up reel; and
   second power means for supplying power to the second motor means, the power means denying power to the second motor means in response to a signal provided by the second sensing means indicative the the presence of an amount of film on the take-up reel less than a second predetermind minimum.

12. The film magazine of claim 10 further wherein the first drag means applies a torque between ten and forty inch-ounces.

13. The film magazine of claim 10 further comprising a frame count display adapted to couple to a shutter mechanism within a camera, the frame count display being adapted to count up when the magazine is running film forward and to count down when the magazine is running backward.

14. The film magazine of claim 13 further comprising a reset button for setting the frame count display to zero.

15. The film magazine of claim 14 wherein the frame count display is an LCD display.

16. The film magazine of claim 14 further comprising an indicator adapted to indicate the number of feet of film sotred on the supply reel.

17. The film magazine of claim 13 further comprising:
   a manually operable switch; and
   means for advancing the count displayed by the film count display independently of the shutter mechanism in response to actuation of the manually operable switch.

18. The film magazine of claim 10 wherein the first drag means includes a first selectively rotatable housing, the torque being applied by the first drag means varying in response to a selectively rotated position of the first rotatable housing.

19. The film magazine of claim 18 wherein the second drag means includes a second selectively rotatable housing, the torque being applied by the second drag means varying in response to a selectively rotated position of the second rotatable housing.

20. The film magazine of claim 18 wherein the first drag means comprises:
   a first pad;
   a second pad;
   the first said disk rotating between the first pad and the second pad;
   spring means for applying a force to the first pad, the spring means pushing against and between the first pad and the first rotatable housing, the spring means becoming compressed and providing a greater force when the first rotatable housing is selectively rotated in one direction, the spring means becoming less compressed and providing a lesser force when the first selectively rotatable housing is rotated in another direction opposite the one direction.

21. The film magazine of claim 20 wherein the spring means includes a pressure disk and a wave washer.

* * * * *